US009055012B2

(12) United States Patent
Ehrlich et al.

(10) Patent No.: US 9,055,012 B2
(45) Date of Patent: *Jun. 9, 2015

(54) BOT-NETWORK DETECTION BASED ON SIMPLE MAIL TRANSFER PROTOCOL (SMTP) CHARACTERISTICS OF E-MAIL SENDERS WITHIN IP ADDRESS AGGREGATES

(71) Applicant: AT&T Intellectual Property I, L.P., Atlanta, GA (US)

(72) Inventors: Willa Kay Ehrlich, Highland Park, NJ (US); David A. Hoeflin, Middletown, NJ (US); Danielle Liu, Morganville, NJ (US); Chaim Spielman, Spring Valley, NY (US); Stephen Wood, Whitehouse Station, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/857,269

(22) Filed: Apr. 5, 2013

(65) Prior Publication Data

US 2013/0227045 A1     Aug. 29, 2013

Related U.S. Application Data

(63) Continuation of application No. 12/756,428, filed on Apr. 8, 2010, now Pat. No. 8,438,638.

(51) Int. Cl.
| | |
|---|---|
| *H04L 29/06* | (2006.01) |
| *H04L 12/58* | (2006.01) |
| *G06F 11/00* | (2006.01) |
| *G06F 12/14* | (2006.01) |
| *G06F 12/16* | (2006.01) |
| *G08B 23/00* | (2006.01) |

(52) U.S. Cl.
CPC ............ *H04L 51/00* (2013.01); *H04L 63/1441* (2013.01)

(58) Field of Classification Search
None
See application file for complete search history.

(56) References Cited

U.S. PATENT DOCUMENTS 8,056,132 B1 * 11/2011 Chang et al. .................... 726/23
2007/0282955 A1 * 12/2007 Lin et al. ......................... 709/206

(Continued)

OTHER PUBLICATIONS

Schmittlein, David C., et al., "Is the Customer Still Active?" The American Statistician, vol. 39, No. 4, Part 1 (Nov. 1985), pp. 291-295.

*Primary Examiner* — Shin-Hon Chen
(74) *Attorney, Agent, or Firm* — Chiesa Shahinian & Giantomasi PC (57) ABSTRACT

A method and system for determining whether an IP address is part of a bot-network are provided. The IP-address-aggregate associated with the IP address of an e-mail sender is determined. The IP-address-aggregate is associated with an IP-address-aggregate-category based on the current SMTP traffic characteristics of the IP-address-aggregate and the known SMTP traffic characteristics of an IP-address-aggregate-category. A bot-likelihood score of the IP-address-aggregate-category is then associated with IP-address-aggregate. IP-address-aggregate-categories can be established based on historical SMTP traffic characteristics of the IP-address-aggregates. The IP-address-aggregates are grouped based on SMTP characteristics, and the IP-address-aggregate-categories are defined based on a selection of IP-address-aggregates with similar SMTP traffic characteristics that are diagnostic of spam bots vs. non-botnet-controllers spammers. Bot likelihood scores are determined for the resulting IP-address-aggregate-categories based on historically known bot IP addresses.

18 Claims, 7 Drawing Sheets

(56) References Cited

U.S. PATENT DOCUMENTS

| | | | |
|---|---|---|---|
| 2008/0120413 A1* | 5/2008 | Mody et al. | 709/226 |
| 2009/0172815 A1* | 7/2009 | Gu et al. | 726/23 |
| 2010/0095374 A1* | 4/2010 | Gillum et al. | 726/22 |
| 2010/0281539 A1* | 11/2010 | Burns et al. | 726/23 |
| 2011/0302656 A1* | 12/2011 | El-Moussa | 726/24 |
| 2011/0320816 A1* | 12/2011 | Yao et al. | 713/171 |
| 2012/0233656 A1* | 9/2012 | Rieschick et al. | 726/1 |

\* cited by examiner

```
for (IP-Address-Aggregate in List_IP-Address-Aggregates_still_SMTP_active)
{
        IP-Address-Aggregate_number_of_elapsed_periods_i ++
        # if (IP-Address-Aggregate i is in list of IP-Address-Aggregates currently SMTP active
        If (IP-Address-Aggregate_i in List_IP-Address-Aggregates_SMTP_active^t)
        {
                IP-Address-Aggregate_period_active_last_i =IP-Address-Aggregate_number_of_elapsed_periods_i
                IP-Address-Aggregate_number_of_active_periods_i ++
                #Update number of unique email senders in IP-Address-Aggregate i unadjusted for email sender activity
                IP-Address-Aggregate_unique_email_senders_i = IP-Address-Aggregate_unique_email_senders_i +
                        (IP-Address-Aggregate_email_senders^t_i - IP-Address-Aggregate_unique_email_senders_i)
                #Update number of unique email senders in IP-Address-Aggregate i adjusted for email sender activity
                for (IP in List_IP-Address-Aggregate_IPs_still_SMTP_active_i)
                {
                        IP-Address-Aggregate_IP_number_of_elapsed_periods_k^i ++
                        if (IP_k^i is in IP-Address-Aggregate_email_senders_i^t) # if IP k is in IP-Address-Aggregate_i current email senders
                        {
                                IP-Address-Aggregate_IP_period_active_last_k^i = IP-Address-Aggregate_IP_number_of_elapsed_periods_k^i
                                IP-Address-Aggregate_iP_number_of_active_periods_k^i ++
                        }
                        else #Remove not currently active IP-Address-Aggregate IPs that are no longer SMTP active
                        {
                                P_k^i = (IP-Address-Aggregate_IP_period_active_last_k^i /
                                        IP-Address-Aggregate_IP_number_of_elapsed_periods_k^i )**
                                                IP-Address-Aggregate_iP_number_of_active_periods_k^i
                                if (P_k^i < p0)
                                {
                                        List_IP-Address-Aggregate_IPs_still_SMTP_active_i =
                                        List_IP-Address-Aggregate_IPs_still_SMTP_active_i - IP_k^i
                                }
                        }
                }
        }
        else # else if IP-Address-Aggregate_i is not currently SMTP active, remove SMTP inactive IP-Address-Aggregate
        {
                P_i = (IP-Address-Aggregate_period_active_last_i / IP-Address-Aggregate_number_of_elapsed_periods_i )**
                IP-Address-Aggregate_number_of_active_periods_i
                If (P_i < p0) List_IP-Address-Aggregates_still_SMTP_active= List_IP-Address-Aggregates_still_SMTP_active – IP-Address-Aggregate_i
        }
}
```

```
for (IP-Address-Aggregate in List_IP-Address-Aggregates_SMTP_active $^t$ )
{
        if (IP-Address-Aggregate$_i$ not in in List_IP-Address-Aggregates_still_SMTP_active)
        {
        # New IP-Address-Aggregate. Set IP-Address-Aggregate parameters
                List_IP-Address-Aggregates_still_SMTP_active= List_IP-Address-Aggregates_still_SMTP_active U IP-Address-Aggregate $_i$
                IP-Address-Aggregate_unique_email_senders $_i$ = IP-Address-Aggregate_email_senders $_i^t$
                IP-Address-Aggregate_number_of_elapsed_periods $_i$ =0
                #Set IP-Address-Aggregate IPs' parameters
                List_IP-Address-Aggregate_IPs_still_SMTP_active $_i$ = IP-Address-Aggregate_email_senders $^t_i$
                for (IP in List_IP-Address-Aggregate_IPs_still_SMTP_active $_i$ )
                {
                        IP-Address-Aggregate_iP_number_of_elapsed_periods $_k^i$ = 0
                }
        }
}
```

BOT-NETWORK DETECTION BASED ON SIMPLE MAIL TRANSFER PROTOCOL (SMTP) CHARACTERISTICS OF E-MAIL SENDERS WITHIN IP ADDRESS AGGREGATES

This application is a continuation of prior application Ser. No. 12/756,428, filed Apr. 8, 2010, which is hereby incorporated by reference.

FIELD

The present disclosure relates to the detection of computers under the control of a bot-network, and more particularly to the comparative analysis of SMTP characteristics of e-mail senders within an IP-address-aggregate to detect bot-controlled computers.

BACKGROUND

Computer viruses and malicious software (collectively hereinafter "malware") are proliferating via the Internet. Malware can be used to establish controlled networks of infected computers ("bot-net" or "bot-network") for the automation of distribution of unsolicited electronic mail (i.e., "spam"). Spam that is sent from a bot-network can be difficult to detect and/or prevent for a variety of reasons. Typically, computers that are part of a bot-network are associated with a short-lived IP address (e.g., a dynamic address) that does not generate enough network traffic to establish a "reputation." Additionally, such bot-network controlled computers transmit low volumes of spam for short periods of time so as to remain inconspicuous. Thus, conventional spam detection methods, such as address-based (e.g., blacklisting) and volume-based filtering, are ineffective for spam bot detection.

SUMMARY

In accordance with the present disclosure, a method and system for determining whether a spammer IP address is part of a bot-network are provided. In one embodiment, the system first determines the IP-address-aggregate associated with the IP address of an e-mail sender. The IP-address-aggregate is then associated with one of a plurality of IP-address-aggregate-categories based on the currently observed Simple Mail Transfer Protocol (SMTP) traffic characteristics of the IP-address-aggregate and the established SMTP traffic characteristics of the IP-address-aggregate-category. A bot-likelihood score of the IP-address-aggregate category is then associated with the IP-address-aggregate.

In an embodiment, the IP-address-aggregate-categories can be determined based on historical SMTP traffic characteristics of the IP-address-aggregates. SMTP traffic characteristics are determined based on observed network data. The IP-address-aggregate-categories are defined based on a selection of IP-address-aggregates, where IP-address-aggregates within an IP-address-aggregate-category have similar SMTP traffic characteristics.

In a further embodiment, the bot-likelihood score can be determined based on a ratio of a number of bot-IP addresses in the particular IP-address-aggregate-category to a number of bot-IP addresses in the other IP-address-aggregate-categories, divided by a ratio of a number of non-bot-IP addresses in the particular IP-address-aggregate-category to a number of non-bot-IP addresses in the other IP-address-aggregate-categories. The number of bot-IP addresses in the particular IP-address-aggregate-category, the number of bot-IP addresses in the other IP-address-aggregate-categories, the number of non-bot-IP addresses in the particular IP-address-aggregate-category, and the number of non-bot-IP addresses in the other IP-address-aggregate-categories are determined based on known bot IP addresses associated with IP-address-aggregates and hence IP-address-aggregate-categories.

These and other advantages will be apparent to those of ordinary skill in the art by reference to the following description and the accompanying drawings.

BRIEF DESCRIPTION OF THE DRAWINGS

FIGS. 3A and 3B illustrate pseudo-code for determining whether an IP-address aggregate is SMTP-active and whether e-mail senders within an SMTP-active IP-address-aggregate are SMTP-active;

DETAILED DESCRIPTION

Figure 1:
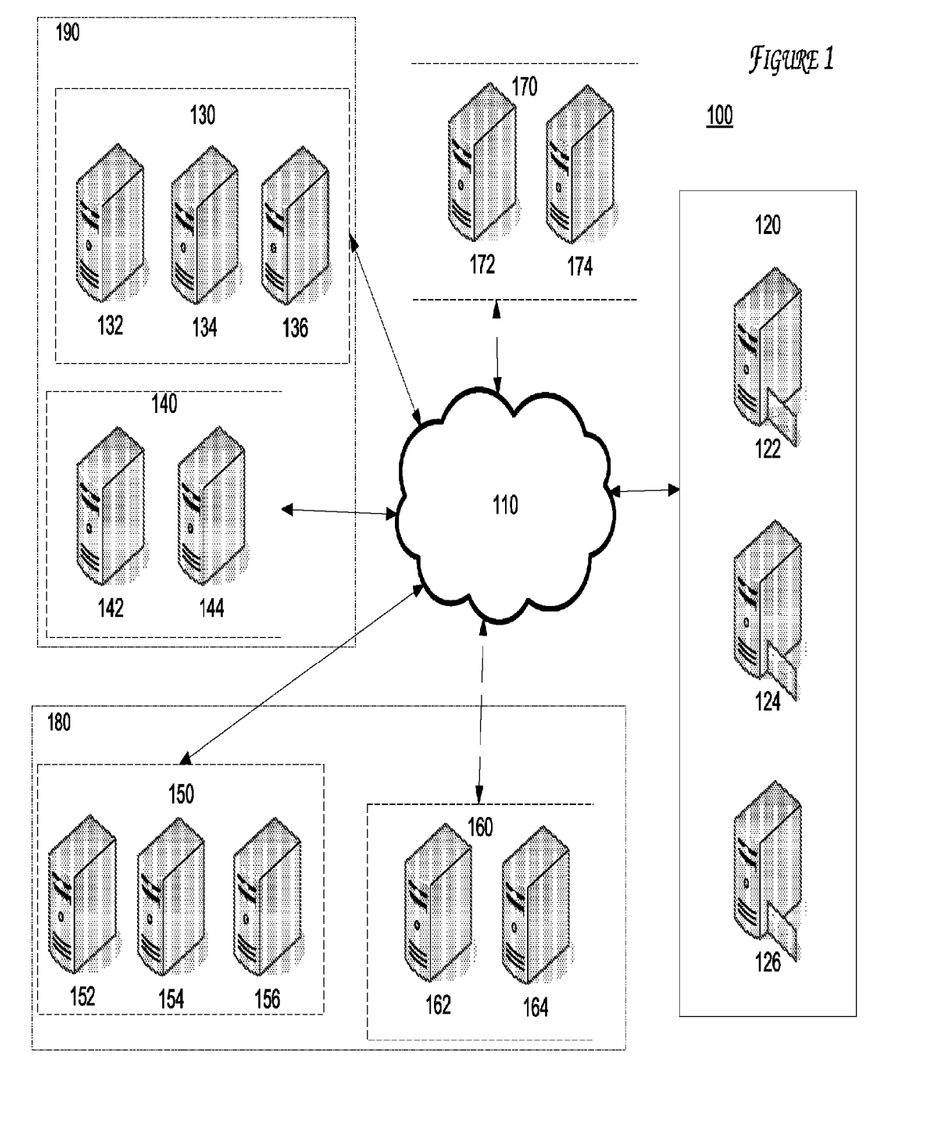
FIG. 1 is an illustration of an exemplary network.

A network environment 100 is illustrated in FIG. 1. The network environment 100 includes a network 110 through which an organization 120, such as a network provider, and the organization's mail servers 122, 124, and 126 can communicate with other computers. The network environment 100 includes various other computers, each being associated with an IP address. The computers are grouped into IP-address-aggregates, which are illustrated in FIG. 1 surrounded by broken lines. For example, IP-address-aggregate 130 includes computers 132, 134, and 136.

Each IP-address-aggregate comprises a particular subnet, such that any computer having an IP address within a particular subnet would be considered a member of the same IP-address-aggregate. A person of ordinary skill in the art would understand that any subnet grouping of IP addresses could be used to define the IP-address-aggregates by using the appropriate netmask. However, for purposes of illustration, the discussion below considers a netmask of 255.255.255.0 such that each IP-address-aggregate is a particular class C range of IP addresses. For example, and as illustrated in FIG. 1, IP-address-aggregate 130 includes computers 132, 134, and 136 having IP addresses ranging from 192.168.3.0 to 192.168.3.255. IP-address-aggregate 140 includes computers 142 and 144 having IP addresses ranging from 192.168.4.0 to 192.168.4.255. IP-address-aggregate 150 includes computers 152, 154, and 156 having IP addresses ranging from 192.168.5.0 to 192.168.5.255. IP-address-aggregate 160 includes computers 162, 164, and 166 having IP addresses ranging from 192.168.6.0 to 192.168.6.255. IP-address-aggregate 170 includes computers 172, 174, and 176 having IP addresses ranging from 192.168.7.0 to 192.168.7.255.

As is discussed in detail below with respect to FIGS. 2, 3, 4 and 5 the Simple Mail Transfer Protocol (SMTP) characteristics of the e-mail senders within each IP-address-aggregate can be analyzed as a group. The IP-address-aggregates of the e-mail senders can then be grouped to create IP-address-aggregate-categories, such that the IP-address-aggregates within an IP-address-aggregate-category are likely to exhibit similar SMTP characteristics relevant to spam bot behavior. Therefore, if an IP address can be effectively aggregated then the reputation of an unknown IP address can be derived from the historical reputation of the aggregate to which it belongs.

The SMTP characteristics of each IP-address-aggregate that are analyzed include the number of blacklisted e-mail senders within a given period of time (e.g., hourly), the entropy of an IP-address-aggregate's volume of transmitted SMTP traffic within a given period of time (e.g., hourly), the total number of unique e-mail senders in an IP-address-aggregate dynamically adjusted for IP-address-aggregate SMTP inactivity, and the total number of unique e-mail senders in a SMTP-active IP-address-aggregate dynamically adjusted for inactive e-mail senders. These SMTP characteristics are discussed in more detail below.

Based on historical data (e.g., observed network traffic), the likelihood an email sender from within an IP-address-aggregate-category is part of a bot-network can be determined. That is, each IP-address-aggregate-category can be assigned a bot-likelihood score that indicates the probability that any email sender that is a member of an IP-address-aggregate whose SMTP traffic characteristics match those of the IP-address-aggregate-category is part of a bot-network. FIG. 1 illustrates two IP-address-aggregates 150 and 130 whose current SMTP traffic characteristics indicate that they match the SMTP-traffic-characteristics of IP-address-aggregate categories 180 and 190 respectively. Consequently, for the current period of time, IP-address-aggregates 150 and 130 can be assigned bot-likelihood scores associated with their respective IP-address-aggregate categories, namely 180 and 190.

It should be noted that while each IP address is fixed, based on the aggregation technique, with respect to a particular IP-address-aggregate, the association of each IP-address-aggregate with an IP-address-aggregate-category can change, for example as bot-networks lose or gain control of specific machines. Thus, while FIG. 1 illustrates IP-address-aggregates 150 and 160 as associated with IP-address-aggregate-category 180, one of ordinary skill in the art would understand that this association may change. For example, IP-address-aggregate 150 may become associated with IP-address-aggregate category 190 and IP-address-aggregate 160 may not be associated with an IP-address-aggregate-category. Similarly, while IP-address-aggregates 130 and 140 are illustrated as associated with IP-address-aggregate-category 190, these associations may also change.

In accordance with one example, the detection of bot-networks can be broken down into three steps. First, the IP-address-aggregate-categories are determined based on IP-address-aggregate SMTP traffic characteristics. Second, the likelihood of a bot IP given the IP-address-aggregate-category is computed based on known bot IP addresses. Third, an e-mail sender IP address can then be categorized as being a member of a specific address-aggregate-category based on its IP-address-aggregate's current SMTP traffic characteristics and the IP-address-aggregate-categories determined earlier. The IP address would then "inherit" the bot likelihood score (i.e., the probability that the IP address is part of a bot-network) associated with its matching IP-address-aggregate-category.

While the three steps can be combined in a single process, each can operate alone or in various combinations. For example, IP-address-aggregate-categories can be determined (i.e., the first step) by a first entity and provided to other entities for use in categorizing IP addresses. These other entities could, in turn, generate their own bot likelihood scores (i.e., the second step) using their own list of known bot IP addresses and their own Netflow-type data, together with these IP-address-aggregate-categories to implement an entity-specific bot-network detection system (i.e., the third step). Similarly, a network provider can obtain IP-address-aggregate-category data and known bot IP addresses data from a third party for use within a bot-network detection system in their network infrastructure. For purposes of discussion, we first illustrate and discuss the categorization of e-mail senders' IP addresses based on the currently observed SMTP traffic characteristics of their IP-address-aggregates and the IP-address-aggregate-category data. Subsequently, we illustrate and discuss how IP-address-aggregate-categories and their bot likelihood scores are determined.

Figure 2:
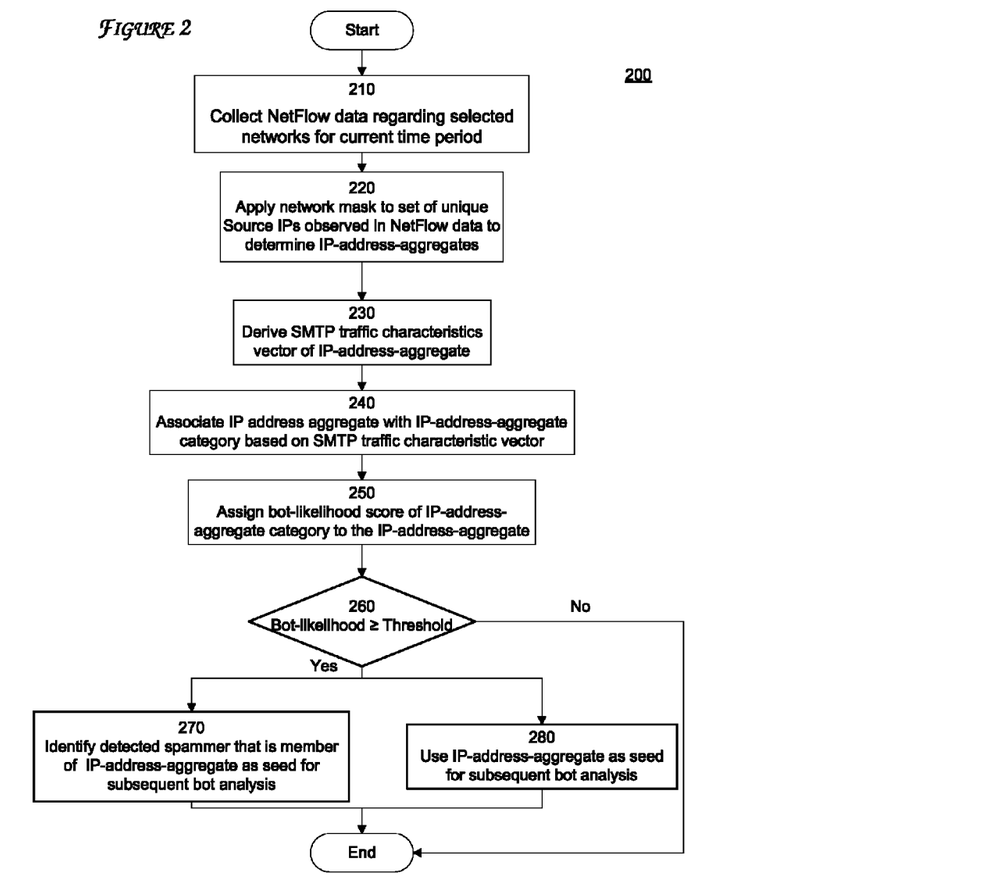
FIG. 2 is a flowchart of a process in accordance with an embodiment of the present disclosure.

FIG. 2 is a flowchart of an embodiment of a process 200 for determining the likelihood an IP address of an email sender is under the control (i.e., part of) a bot-network. When an email is received by an e-mail server such as server 122 of organization 120, the e-mail sender (e.g., computer 172 having an IP address of 192.168.7.2) can be identified by its IP address. A bot-detection system can determine the IP-address-aggregate associated with the IP address of the e-mail sender. By analyzing network traffic to determine its IP-address-aggregate current SMTP traffic characteristics and applying the likelihood that an IP-address-aggregate with these SMTP traffic characteristics contains a bot-controlled computer, the reputation of the particular IP address can be derived based on historical reputation of the IP-address-aggregate with which it is associated.

At step 210, network traffic data (e.g., NetFlow data) are periodically collected (e.g., once an hour) for specific networks that are being monitored. In accordance with step 220, at each time t, a network mask (i.e., "netmask") is applied to the set of observed unique Source-IP addresses in the NetFlow data to derive IP address aggregates. Other sources of network traffic characteristic data include Jflow, Cflowd, and NetStream. For conciseness and ease of description, hereinafter, monitored network traffic data are referred to as NetFlow data. The SMTP-traffic-characteristic-vector of each IP-address-aggregate is derived at step 230 based on the NetFlow data.

With respect to an IP-Address-Aggregate at time t, the SMTP characteristics derived include the following:

1. IP-Address-Aggregate observed number of Black Listed E-Mail Senders at time t:
   IP-Address-Aggregate_Nu_Blacklisted_Senders$_i^t$
2. IP-Address-Aggregate observed entropy at time t:
   IP-Address-Aggregate_Entropy$_i^t$ $$IP-Address-Aggregste\_Entropy_i^t = \sum_{ip=1}^{nip} p_{ip}^t \log p_{ip}^t$$

$$p_{ip}^t = \frac{Number\_of\_SMTP\_Traffic\_Bytes\_for\_IP-Address-Aggregate_i\_IP_{ip}\_at\_time\_t}{Total\_Number\_of\_SMTP\_Traffic\_Bytes\_for\_IP-Aggregate_i\_at\_time\_t}$$

3. IP-Address-Aggregate total observed number of unique E-Mail; Senders at time t dynamically adjusted for IP-Address-Aggregate SMTP inactivity:
   IP-Address-Aggregate_Total_Nu_Senders1$_i^t$
   An IP-Address-Aggregate initially active at the start of an observation interval can be deemed inactive at time τ, following a long period of inactivity. If the IP-Address-Aggregate resumes to being SMTP-active at time τ+n, then the number of unique E-Mail Senders associated with the IP-Address-Aggregate will be set to the number of E-Mail Senders observed for that IP-Address-Aggregate at time τ+n.

4. IP-Address-Aggregate total observed number of unique E-Mail Senders dynamically adjusted for inactive E-Mail Senders, given a SMTP-active IP-Address-Aggregate:

IP-Address-Aggregate_Total_Nu_Senders2$_i^t$

An E-Mail Sender initially active at the start of an observation interval can be deemed inactive at time τ, following a long period of inactivity so that at time τ, the cumulative number of unique E-Mail Senders for that IP-Address-Aggregate will be decremented by 1. If the IP resumes to being SMTP-active at time τ+n, then, at time τ+n, the number of unique E-Mail Senders associated with that IP-Address-Aggregate will be incremented by 1.

These four variables can be expressed as a SMTP-characteristic vector.

Step 230 of FIG. 2 applies to calculating these four variables of an SMTP characteristic vector associated with an IP-Address-Aggregate at time t (i.e., IP-Address-Aggregate_Nu_Blacklisted_Senders$_i^t$, IP-Address-Aggregate_Entropy$_i^t$, IP-Address-Aggregate_Total_Nu_Senders 1$_i^t$, IP-Address-Aggregate_Total_Nu_Senders2$_i^t$). An IP-Address-Aggregate observed number of Black Listed E-Mail Senders at time t and an IP-Address-Aggregate observed entropy at time t are straight-forward metrics that can be calculated based only on current data in step 230 of FIG. 2. In contrast, persistent data are required to calculate the total number of unique E-Mail Senders associated with an IP-Address-Aggregate in step 230 of FIG. 2.

With respect to the IP-Address-Aggregate total number of unique E-Mail Senders, under the hypothesis that a IP-Address-Aggregate was SMTP-active at the beginning of the observation period (normalized time=0) and is still active at the end of this interval (normalized time=1), then n Poisson active periods will randomly split this unit of time. Thus, the n active periods can be considered independently and identically-distributed ("iid") uniform (0,1) random variables. Hence, the time of the last observation τ is the largest order statistic from n iid uniform random variables. The largest order statistic has a density function, $$f(\tau) = n\tau^{n-1}, 0 < \tau < 1,$$

and a mean, $$E(\tau) = n/(n+1).$$

Assuming a IP-Address-Aggregate is still SMTP active ($H_0$: IP-Address-Aggregate SMTP Active), the time of the last nth active period has a density function given by $f(\tau)$. Small values of τ are indicative of currently SMTP-inactive IP-Address-Aggregates so that a one-tailed p level for $H_0$ is $$p = \int_0^\tau ns^{n-1} ds = \tau^n.$$

Thus, the probability that an SMTP-active IP-Address-Aggregate whose latest SMTP-active period is at τ is still active at the end of the measurement interval (i.e., at normalized time=1) decreases with n (with a small n denoting an infrequent but still SMTP-active IP-address-aggregate) and increases with τ (with a large τ denoting an SMTP-active IP-address aggregate that was recently SMTP-active).

Figure 3B:
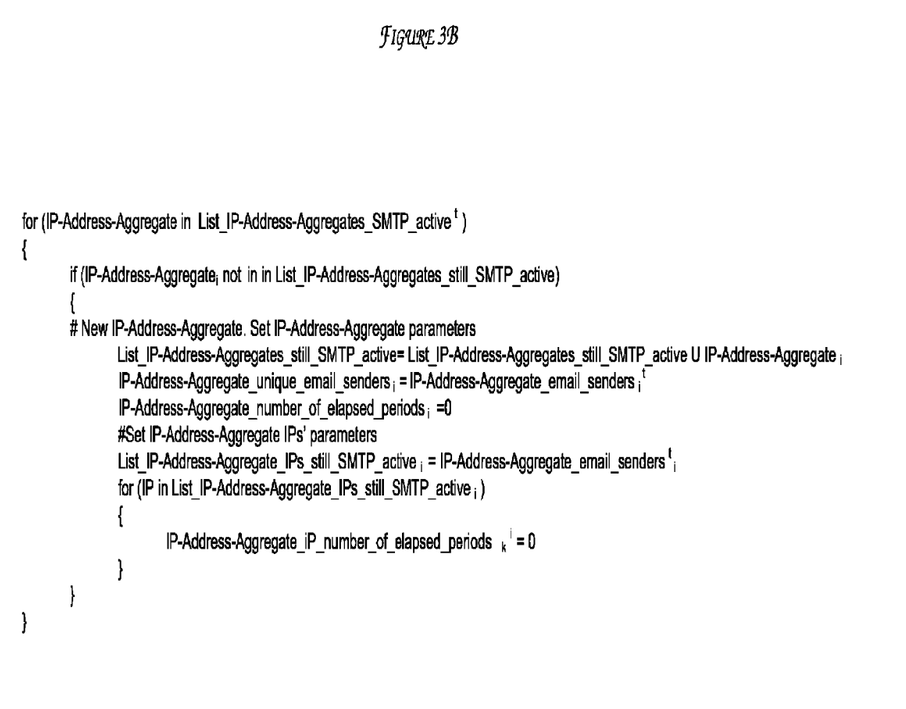

The pseudo-code presented in FIGS. 3A and 3B illustrates a method of determining whether a particular IP-Address-Aggregate and whether e-mail senders within a IP-Address-Aggregate are still SMTP-active. These calculations are required to implement step 230 of FIG. 2.

Persistent SMTP traffic characteristics can be stored in a database, system memory, or other computer storage medium. The data can be organized in tables, data structures, objects (e.g., persistent objects), or other known organization schemes to store, for the current time period time period, t, the number of elapsed time periods, number of active time periods, time period last active and list of unique e-mail senders associated with SMTP-active IP-address-aggregates and to store the number of elapsed time periods, number of active time periods and time period last active associated with SMTP-active IP addresses within SMTP-active IP-address-aggregates. In addition the last two SMTP traffic characteristics described above (i.e., IP-Address-Aggregate_Total_Nu_Senders1$_i^t$, IP-Address-Aggregate_Total_Nu_Senders2$_i^t$) can be stored in a persistent SMTP-traffic-characteristic-vector of length 2, indexed by an IP-address-aggregate reference number. Alternatively, a database can store these last two SMTP traffic characteristic in a separate table indexed by an IP-address-aggregate reference number. A person of ordinary skill in the art would understand that other organizational and storage schemes could be substituted or combined.

Returning to FIG. 2, at step 240, the IP-address-aggregate associated with the IP address of the e-mail sender is matched to an IP-address-aggregate-category based on the current SMTP-traffic-characteristic-vector of the IP-address-aggregate and the SMTP-traffic-characteristic-vector of the IP-address-aggregate-category or models derived from the SMTP-traffic-characteristic-vector of the IP-address-aggregate-category. Association of the IP-address-aggregate with an IP-address-aggregate-category can be performed using a Bayesian classification rule. Alternatively, other classification schemes can be used including linear classification, quadratic classification, statistical classification, or fuzzy logic classification. This process allows for the re-assessment of an IP-address-aggregate given its current SMTP-traffic-characteristics vector. Thus, even if a particular IP-address-aggregate were previously associated with an IP-address-aggregate-category, the current SMTP-traffic-characteristics vector of the particular IP-address-aggregate may warrant re-assignment to a different IP-address-aggregate-category.

The SMTP-traffic-characteristic-vector for each IP-address-aggregate-category can be computed at a server of the organization 120. Alternatively, SMTP-traffic-characteristic-vectors of the various IP-address-aggregate-categories can be compiled using data from multiple e-mail servers at a computer that is located on-site or off-site. These data can be downloaded or access as needed by an e-mail server to perform the association analysis at step 240.

A bot-likelihood score is associated with each IP-address-aggregate-category. The bot-likelihood score is a measure of the probability that an IP address within an IP-address-aggregate is part of a bot-network. As similarly noted with respect to the IP-address-aggregate-categories, the bot-likelihood score can be stored remotely or locally and can be computed using data from multiple e-mail servers. The computation of the bot-likelihood score is explained in FIG. 5.

At step 250, the bot-likelihood score of the IP-address-aggregate-category with which the IP-address-aggregate has been associated is assigned to the IP-address-aggregate of the e-mail sender. It should be noted that this allows for the determination of a bot-likelihood score for IP-address-aggregates that were not previously considered during computation of the IP-address-aggregate-categories or in the computation of the bot-likelihood scores associated with IP-address-aggregate-categories. Furthermore, this process allows for the re-assessment of an IP-address-aggregate given its current SMTP-traffic-characteristic-vector. That is, even if a particular IP-address-aggregate were previously associated with an IP-address-aggregate-category having a very low bot-likelihood score, the current SMTP-traffic-characteristic-vector of the particular IP-address-aggregate may warrant assignment to an IP-address-aggregate-category possessing a high bot-likelihood score, which can account for a recent distribution and installation of mal-ware at computers of the particular IP-address-aggregate. Thus, a computer having a previously reliable reputation as determined by historic behavior can be quickly detected as being part of a bot-network based on its current SMTP-traffic-characteristic-vector.

If the bot-likelihood of the IP-address-aggregate is determined at step 260 to be greater than a threshold, then, at step 270, the IP address of the e-mail sender can be selected as potential bot-network controlled IP address and investigated further. Alternatively, at step 280, all IP addresses within the IP address aggregate can be selected as potential bot-network controlled computers and investigated further to determine whether they are compromised machines connected to bot-controllers.

Thus, in accordance with the above process 200, the SMTP characteristics of an IP-address-aggregate can be used to predict the likelihood that an IP-address-aggregate will contain bot-controlled computers. Furthermore, the likelihood that a particular e-mail sender is part of a bot-network can also be predicted. This information can be incorporated into decisions regard subsequent bot-network analysis, blacklisting IP addresses, and IP-address-aggregate blacklisting.

It should be noted that the bot-detection system can operate in various configurations. In one configuration, the bot-detection system is a system within organization 120 and shares the resources and information from all e-mail servers 122, 124, and 126 within the organization 120. Alternative, each e-mail server 122, 124, and 126 can operate an independent bot-detection system. In yet a further configuration, a bot-detection system can be located remotely and configured to communicate with multiple organizations, and the servers of the organizations. In a remote-configuration, or other shared-resource system, the bot-detection system benefits from the information gathered by multiple e-mail servers to provide a more accurate detection system based on a larger data sample.

Figure 4:
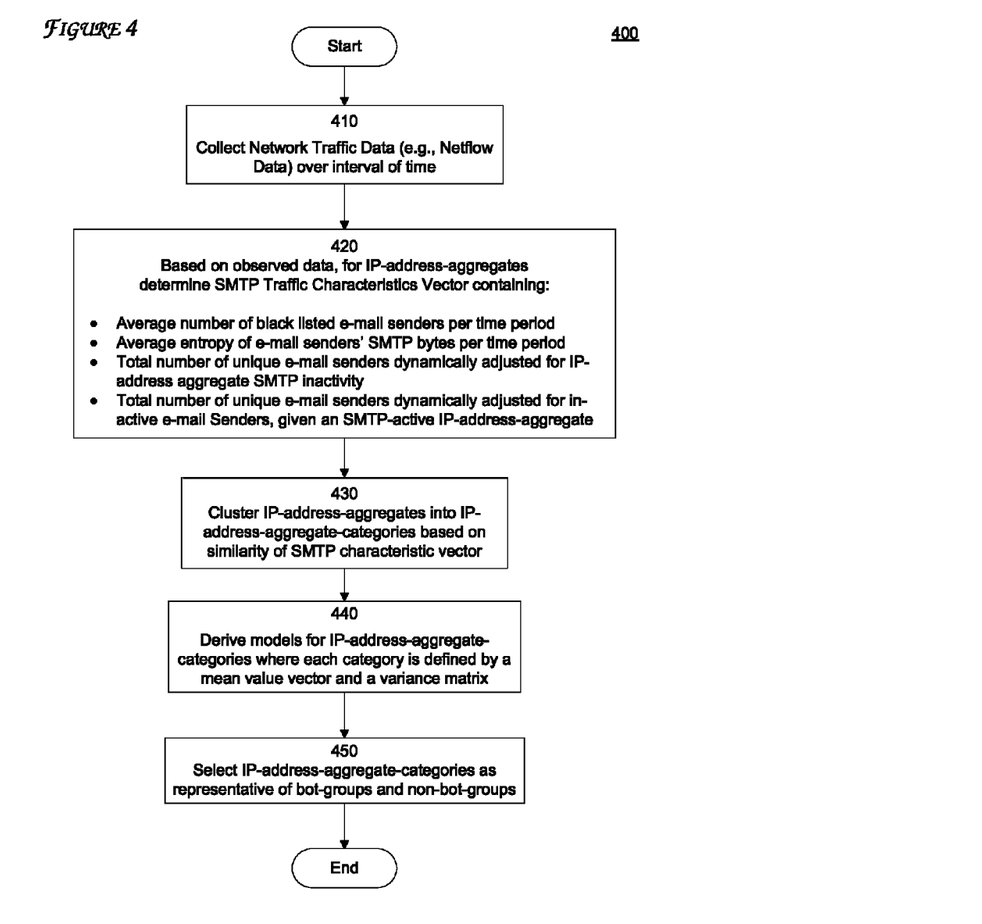
FIG. 4 is a flowchart of a further process in accordance with an embodiment of the present disclosure.
Figure 5:
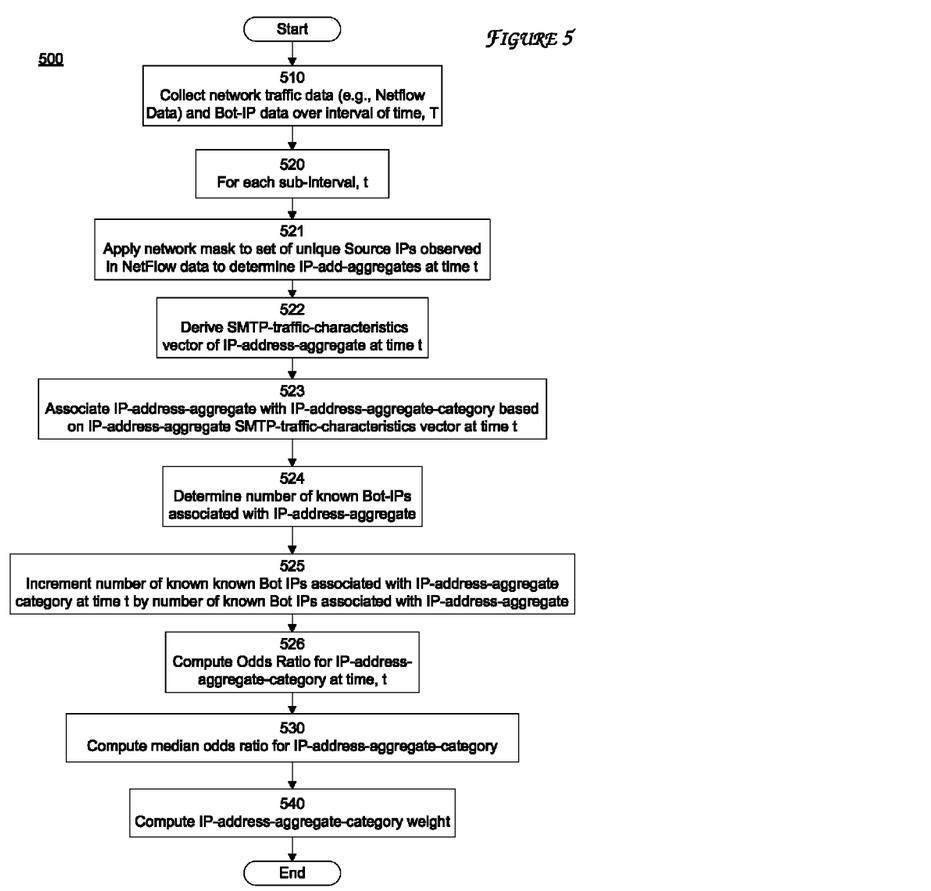
FIG. 5 is a flowchart of a further process in accordance with an embodiment of the present disclosure and FIG. 6 is a high-level block diagram of a computer in accordance with an embodiment of the present disclosure.

The above process 200 utilizes IP-address-aggregate-categories that are determined based on historical observations (i.e., observed data) concerning network traffic and known bot-network membership. FIG. 4 is a flowchart of a further process 400 for defining the IP-address-aggregate-categories discussed above in accordance with an embodiment of the present disclosure. FIG. 5 is a flowchart of a further process 500 for defining bot-likelihood scores associated with the IP-address-aggregate-categories discussed above in accordance with an embodiment of the present disclosure.

In process 400 of FIG. 4, NetFlow-type data are collected at step 410 over an interval of time, T. At step 420, the SMTP-traffic-characteristic-vectors for the IP-address-aggregates, representing address aggregate SMTP traffic characteristics for an "average" sub-interval of time, t (i.e., time period), are computed based on observed data. The SMTP-traffic-characteristic-vector contains the following components:
1. IP-Address-Aggregate average observed number of Black Listed E-Mail Senders per time period:
 IP-Address-Aggregate_Average_Nu_Blacklisted_Senders$_i$
2. IP-Address-Aggregate average observed entropy per time period:
 IP-Address-Aggregate_Average_Entropy$_i$
3. IP-Address-Aggregate total observed number of unique E-Mail; Senders at time t dynamically adjusted for IP-Address-Aggregate SMTP inactivity:
 IP-Address-Aggregate_Total_Nu_Senders1$_i$
4. IP-Address-Aggregate total observed number of unique E-Mail; Senders dynamically adjusted for IP-Address-Aggregate SMTP inactive IP-Addresses:
 IP-Address-Aggregate_Total_Nu_Senders2$_i$ The IP-address-aggregates are then grouped into categories (i.e., IP-address-aggregate-categories) based on the SMTP-traffic-characteristic-vectors at step 430. One process by which the IP-address-aggregates can be grouped is using a cluster analysis such as k-means clustering. However, a person of ordinary skill in the art would recognize that other clustering methods and ways of grouping similar members of a set could be used to determine the IP-address-aggregate-categories.

A model of each IP-address-aggregate-category is derived at step 440. An IP-address-aggregate-category model includes a multivariate model based on SMTP-traffic-characteristic-vectors of the IP-address-aggregates within an IP-address-aggregate-category, and specifies a mean value vector and a variance matrix for the SMTP-traffic-characteristic-vectors of IP-address-aggregates.

At step 450, IP-address-aggregate-categories are selected as representative of bot-groups and non-bot-groups (i.e., representative IP-address-aggregate-categories). For example, based on an analysis of each respective model (e.g., mean value vector, variance matrix) and/or subject matter expertise, certain IP-address-aggregate-categories are selected. That is, IP-address-aggregate-categories having low variance and representative of either a bot-group or a non-bot-group are selected as IP-address-aggregate-categories that will be used in process 200 to determine the likelihood that an email sender is bot-network controlled.

Bot-groups, relative to non-bot-groups, typically reside in IP-address-aggregates that contain a low number of blacklisted SMTP clients per unit time (e.g., hourly), a low entropy value per unit time (e.g., hourly), and a high total number of unique e-mail senders. In contrast, a non-bot group, which may contain spam farmers (i.e., e-mail senders that distribute spam but are not under bot-network control), typically reside in IP-address-aggregates that exhibit a relatively large number of black listed e-mail senders (i.e., known spam hosts) per unit time (e.g., hourly) and a high entropy level per unit time (e.g., hourly)

The IP-address-aggregate-categories can be refined and the number IP-address-aggregate-categories controlled by varying the number of groups in the k-means clustering algorithm. In one example, the number of groups can be varied (i.e., increased or decreased) until the within-group sum of squares summed over groups for a number of groups is within a desirable range. Alternatively, the number of groups can be initialized at a low number (e.g., 1 or 2) and increased until the change in the within-groups sum of squares summed over groups between increments satisfies a criterion. For example, if the decrease in within-group sum of squares summed over groups between n groups and n+1 groups is greater than a certain threshold, then n+1 groups can be utilized. Alternatively, if the rate of change in within-group sum of squares summed over groups between a number of groups (e.g., the rate as determined by 3 groups: n−1, n, and n+1, or 2 groups n and n+1) decreases to less than a certain threshold, the current number of groups can be utilized and not further incremented.

Process 500 in FIG. 5 defines the derivation of the bot-likelihood scores associated with the IP-address-aggregate-categories discussed above. NetFlow-type data and bot-IP data (i.e., data regarding which IP sources are bot-controlled computers) are collected at step 510 over an interval of time, T.

For each sub-interval, t, (step 520) within the interval of time, T, the set of IP-address-aggregates at time t is determined in step 521 and the corresponding SMTP-traffic-characteristic-vectors at time t are derived in step 522. At step 523, at time t, each IP-address-aggregate's SMTP traffic characteristics vector is matched against the SMTP traffic models associated with the IP-address-aggregate-categories discussed above and a determination is made concerning which IP-address-aggregate-category the IP-address-aggregate should be matched to. In step 524, using the bot-IP address data collected at step 510, the number of bot-IP addresses within the IP-address-aggregate is computed and then, in step 525, this number is added to a tally of bot-IP addresses associated with the matching IP-address-aggregate-category at time t.

In step 526, a bot-likelihood score at time t is determined for each IP-address-aggregate-category discussed above. The bot-likelihood score for a given IP-address-aggregate-category at time t can be expressed as the odds of observing bot-network controlled computers within the IP-address-aggregate-category at time t relative to the odds of observing non-bot-network controlled computers within the IP-address-aggregate-category at time t. That is, the bot-likelihood score of an IP-address-aggregate-category at time t can be determined by the ratio of the number of bot-controlled IP addresses in the IP-address-aggregate-category at time t ("n11") divided by the number of bot-controlled IP addresses in all other IP-address-aggregate-categories at time t ("n12") to the number of non-bot-controlled IP addresses in the IP-address-aggregate-category at time t ("n21") divided by the number of non-bot-IP addresses in all other IP-address-aggregate-categories at time t ("n22") (i.e., (n11/n12)/(n21/n22)). Applying a logarithmic transformation of the bot-likelihood score (R), for a given IP-address-aggregate-category, if ln R=0, then the IP-address-aggregate-category is independent of bot-controlled IP membership, if ln R>0, the IP-address-aggregate-category is more likely to include bot-controlled computers, and if ln R<0, the IP-address-aggregate-category is less likely to include bot-controlled computers.

Weights are assigned to the IP-address-aggregate-categories discussed above for predicting the likelihood of Bot IP membership in steps 530 and 540 of process 500. These weights are based on the set of bot-likelihood scores, R, computed for the IP-address-aggregate-categories discussed above for each sub-interval t over the interval of time, T. In step 530 of process 500, the median bot-likelihood score, Median($R_j$) is computed for each IP-address-aggregate-category j. An IP-address-aggregate-category weight, IP-Address-Aggregate-Category_Weight$_j$, is computed for IP-Address-Aggregate-Category$_j$ in step 540 of process 500 as follows:

$$IP-Address-Aggregate-Category\_Weight_j = \frac{Median(R_j)}{\sum_{j=1}^{J} Median(R_j)}$$

A threshold value is applied to these weights associated with the IP-address-aggregate-categories discussed above. Going back to step 260 in process 200 in FIG. 2, at time t, an IP-address-aggregate is matched to an IP-address-aggregate-category, j, with an IP-Address-Aggregate-Category_Weight$_j \geq$Threshold, then either the specific spam IP address or the entire IP-address-aggregate can be used as a seed for subsequent bot analysis at time t.

The processes illustrated in FIGS. 4 and 5, including the determination of IP-address-aggregate categories and bot-likelihood scores, can be repeated periodically or selectively as additional NetFlow data are collected or additional bot-IP addresses are detected.

Figure 6:
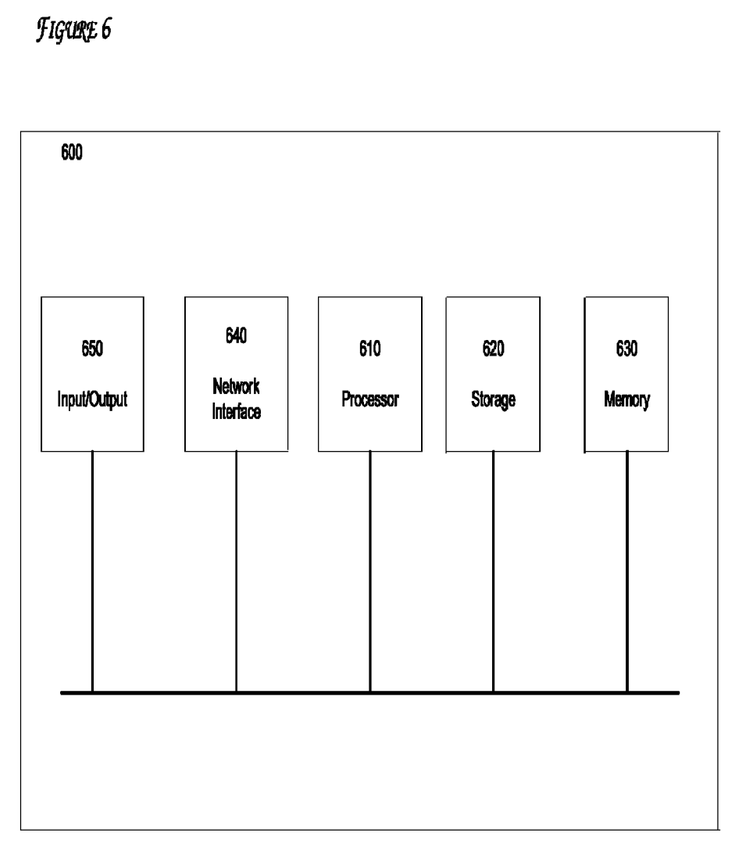

The above-described methods for detecting whether a computer is part of a bot-network and determining IP-address-aggregate-categories representing various SMTP characteristics can be implemented on a computer using well-known computer processors, memory units, storage devices, computer software, and other components. A high-level block diagram of such a computer is illustrated in FIG. 6. Computer 600 contains a processor 610, which controls the overall operation of the computer 600 by executing computer program instructions that define such operations. The computer program instructions may be stored in a storage device 620, or other computer readable medium (e.g., magnetic disk, CD ROM, etc.), and loaded into memory 630 when execution of the computer program instructions is desired. Thus, the method steps of FIGS. 2, 3, 4, and 5 can be defined by the computer program instructions stored in the memory 630 and/or storage 620 and controlled by the processor 610 executing the computer program instructions. For example, the computer program instructions can be implemented as computer executable code programmed by one skilled in the art to perform an algorithm defined by the method steps of FIGS. 2, 3, 4, and 5. Accordingly, by executing the computer program instructions, the processor 610 executes an algorithm defined by the method steps of FIGS. 2, 3, 4, and 5. The computer 600 also includes one or more network interfaces 640 for communicating with other devices via a network. The computer 600 also includes input/output devices 650 that enable user interaction with the computer 600 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the disclosure herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure. The various functional modules that are shown are for illustrative purposes only, and may be combined, rearranged and/or otherwise modified.

We claim:

1. A computer-implemented method for determining whether an internet protocol address is part of a bot-network, the method comprising:
   determining an internet protocol-address-aggregate associated with the internet protocol-address;

associating the internet protocol-address-aggregate with an internet protocol-address-aggregate-category of a plurality of internet protocol-address-aggregate-categories based on simple mail transfer protocol traffic characteristics of the internet protocol-address-aggregate and a plurality of simple mail transfer protocol traffic characteristics of the internet protocol-address-aggregate-category, wherein one of the plurality of simple mail transfer protocol traffic characteristics is a simple mail transfer protocol entropy within a period of time, wherein the plurality of simple mail transfer protocol traffic characteristics of the internet protocol-address-aggregate-category further comprising:
a number of black-listed e-mail senders within the period of time;
a number of active unique e-mail senders adjusted for internet protocol-address-aggregate simple mail transfer protocol inactivity; and
a number of active unique e-mail senders adjusted for individual e-mail sender inactivity given a simple mail transfer protocol-active internet protocol-address-aggregate; and
determining whether the internet protocol-address is part of a bot-network based on a bot-likelihood score of the internet protocol-address-aggregate-category, wherein the bot-likelihood score indicates a probability that the internet protocol-address is part of the bot-network.

2. The method of claim 1, further comprising:
assigning the bot-likelihood score of the internet protocol-address-aggregate-category to the internet protocol-address-aggregate.

3. The method of claim 2, further comprising:
comparing the bot-likelihood score to a threshold.

4. The method of claim 1, wherein the plurality of internet protocol-address-aggregate-categories are determined by:
determining simple mail transfer protocol traffic characteristics of a plurality of internet protocol-address-aggregates based on observed network data;
grouping the plurality of internet protocol-address-aggregates; and
defining the plurality of internet protocol-address-aggregate-categories based on a selection of groups.

5. The method of claim 4, wherein the plurality of internet protocol-address-aggregates is grouped based on k-means clustering.

6. The method of claim 4, further comprising:
determining a simple mail transfer protocol-traffic-characteristic-vector for each of the plurality of internet protocol-address-aggregates; and
grouping the plurality of internet protocol-address-aggregates based on the simple mail transfer protocol-traffic-characteristic-vectors.

7. The method of claim 6, wherein the plurality of internet protocol-address-aggregate-categories are determined by:
deriving internet protocol-address-aggregate-category models for the plurality of internet protocol-address-aggregates, each of the internet protocol-address-aggregate-category models having a simple mail transfer protocol-traffic-characteristic-mean value-vector and a simple mail transfer protocol-traffic-characteristic-vector variance matrix; and
defining the plurality of internet protocol-address-aggregate-categories by selecting certain ones of the internet protocol-address-aggregate-categories based on the internet protocol-address-aggregate-category models derived.

8. The method of claim 1, wherein a bot-likelihood score of a particular internet protocol-address-aggregate-category is determined by a ratio of a number of bot-internet protocol addresses in the particular internet protocol-address-aggregate-category to a number of bot-internet protocol addresses in the other internet protocol-address-aggregate-categories, divided by a ratio of a number of non-bot-internet protocol addresses in the particular internet protocol-address-aggregate-category to a number of non-bot-internet protocol addresses in one or more other internet protocol-address-aggregate-categories,
wherein the number of bot-internet protocol addresses in the particular internet protocol-address-aggregate-category, the number of bot-internet protocol addresses in the one or more internet protocol-address-aggregate-categories, the number of non-bot-internet protocol addresses in the particular internet protocol-address-aggregate-category, and the number of non-bot-internet protocol addresses in the one or more internet protocol-address-aggregate-categories are determined based on observed data.

9. The method of claim 1, wherein the internet protocol-address-aggregate comprises a range of internet protocol addresses for a particular class C of internet protocol-addresses.

10. A system for determining whether an internet protocol address is part of a bot-network comprising:
a processor; and
a data storage device storing computer program instructions that, when executed by the processor, cause the processor to perform operations comprising:
determining an internet protocol-address-aggregate associated with the internet protocol-address;
associating the internet protocol-address-aggregate with an internet protocol-address-aggregate-category of a plurality of internet protocol-address-aggregate-categories based on simple mail transfer protocol traffic characteristics of the internet protocol-address-aggregate and a plurality of simple mail transfer protocol traffic characteristics of the internet protocol-address-aggregate-category, wherein one of the plurality of simple mail transfer protocol traffic characteristics is a simple mail transfer protocol entropy within a period of time, wherein the plurality of simple mail transfer protocol traffic characteristics of the internet protocol-address-aggregate-category further comprising:
a number of black-listed e-mail senders within the period of time;
a number of active unique e-mail senders adjusted for internet protocol-address-aggregate
simple mail transfer protocol inactivity; and
a number of active unique e-mail senders adjusted for individual e-mail sender inactivity given a simple mail transfer protocol-active internet protocol-address-aggregate; and
determining whether the internet protocol-address is part of a bot-network based on a bot-likelihood score of the internet protocol-address-aggregate-category, wherein the bot-likelihood score indicates a probability that the internet protocol-address is part of the bot-network.

11. The system of claim 10, the operations further comprising:
assigning the bot-likelihood score of the internet protocol-address-aggregate-category to the internet protocol-address-aggregate.

12. The system of claim 10, wherein the plurality of internet protocol-address-aggregate-categories are determined by:
- determining simple mail transfer protocol traffic characteristics of a plurality of internet protocol-address-aggregates based on observed network data;
- grouping the plurality of internet protocol-address-aggregates; and
- defining the plurality of internet protocol-address-aggregate-categories based on a selection of groups.

13. The system of claim 12, wherein the plurality of internet protocol-address-aggregates is grouped based on k-means clustering.

14. The system of claim 12, the operations further comprising:
- determining a simple mail transfer protocol-traffic-characteristic-vector for each of the plurality of internet protocol-address-aggregates; and
- grouping the plurality of internet protocol-address-aggregates based on the simple mail transfer protocol-traffic-characteristic-vectors.

15. The system of claim 14, wherein the plurality of internet protocol-address-aggregate-categories are determined by:
- deriving internet protocol-address-aggregate-category models for the plurality of internet protocol-address-aggregates, each of the internet protocol-address-aggregate-category models having a simple mail transfer protocol-traffic-characteristic-mean value-vector and a simple mail transfer protocol-traffic-characteristic-vector variance matrix; and
- defining the plurality of internet protocol-address-aggregate-categories by selecting certain ones of the internet protocol-address-aggregate-categories based on the internet protocol-address-aggregate-category models derived.

16. The system of claim 10, wherein a bot-likelihood score of a particular internet protocol-address-aggregate-category is determined by a ratio of a number of bot-internet protocol addresses in the particular internet protocol-address-aggregate-category to a number of bot-internet protocol addresses in the other internet protocol-address-aggregate-categories, divided by a ratio of a number of non-bot-internet protocol addresses in the particular internet protocol-address-aggregate-category to a number of non-bot-internet protocol addresses in one or more other internet protocol-address-aggregate-categories,
- wherein the number of bot-internet protocol addresses in the particular internet protocol-address-aggregate-category, the number of bot-internet protocol addresses in the one or more internet protocol-address-aggregate-categories, the number of non-bot-internet protocol addresses in the particular internet protocol-address-aggregate-category, and the number of non-bot-internet protocol addresses in the one or more internet protocol-address-aggregate-categories are determined based on observed data.

17. The system of claim 10, the operations further comprising:
- comparing the bot-likelihood score to a threshold.

18. The system of claim 10, wherein the internet protocol-address-aggregate comprises a range of internet protocol addresses for a particular class C of internet protocol-addresses.

\* \* \* \* \*